US012598287B2

(12) United States Patent
Weber et al.

(10) Patent No.: US 12,598,287 B2
(45) Date of Patent: Apr. 7, 2026

(54) DISPLAY DEVICE, METHOD, COMPUTER PROGRAM CODE, AND APPARATUS FOR PROVIDING A CORRECTION MAP FOR A DISPLAY DEVICE, METHOD AND COMPUTER PROGRAM CODE FOR OPERATING A DISPLAY DEVICE

(71) Applicant: Continental Automotive Technologies GmbH, Hannover (DE)

(72) Inventors: Markus Weber, Mainz (DE); Andreas Brüninghaus, Wiehl (DE); Jürgen Bäthis, Wetzlar (DE); Jochen Möller, Darmstadt (DE); Jan Hermes, Frankfurt am Main (DE); Kai Hohmann, Babenhausen (DE)

(73) Assignee: Continental Automotive Technologies GmbH, Hannover (DE)

( * ) Notice: Subject to any disclaimer, the term of this patent is extended or adjusted under 35 U.S.C. 154(b) by 27 days.

(21) Appl. No.: 18/241,466

(22) Filed: Sep. 1, 2023

(65) Prior Publication Data

US 2024/0080434 A1      Mar. 7, 2024

(30) Foreign Application Priority Data

Sep. 6, 2022      (EP) .................................... 22194150

(51) Int. Cl.
H04N 13/366          (2018.01)
G09G 3/00          (2006.01)
(Continued)

(52) U.S. Cl.
CPC ........... H04N 13/366 (2018.05); G09G 3/003 (2013.01); H04N 13/327 (2018.05);
(Continued)

(58) Field of Classification Search
CPC ... G09G 2320/0626; G09G 2320/0666; G09G 2320/0686; G09G 3/003; G09G 3/2003;
(Continued)

(56) References Cited

U.S. PATENT DOCUMENTS 9,201,270 B2    12/2015  Fattal et al.
10,649,128 B2    5/2020  Fattal et al.
(Continued)

FOREIGN PATENT DOCUMENTS

DE      102021200857 A1    11/2021
DE      102021210404 A1    3/2023
(Continued)

OTHER PUBLICATIONS

Office Action of corresponding European Patent Application No. 22194150.3, dated Jan. 12, 2026.

*Primary Examiner* — Christopher S Kelley
*Assistant Examiner* — Ana Picon-Feliciano
(74) *Attorney, Agent, or Firm* — COZEN O'CONNOR

(57)          ABSTRACT

The present disclosure is related to a display device. The disclosure is further directed towards a method, a computer program code, and an apparatus for providing a correction map for such a display device. The disclosure is further related to a method and a computer program code for operating a display device. The display device comprises a display panel comprising pixels, a cover element, and a decorative element arranged on the cover element. An individual brightness of the pixels of the display panel is adapted to a light transmissivity of the decorative element at the respective pixel positions.

13 Claims, 5 Drawing Sheets

(51) Int. Cl.
  *H04N 13/305*        (2018.01)
  *H04N 13/327*        (2018.01)
  *H04N 13/398*        (2018.01)
(52) U.S. Cl.
  CPC ... *H04N 13/398* (2018.05); *G09G 2320/0626* (2013.01); *H04N 13/305* (2018.05)
(58) Field of Classification Search
  CPC .. H04N 13/305; H04N 13/327; H04N 13/366; H04N 13/398
  USPC .......................................................... 348/51
  See application file for complete search history.

(56)           References Cited

U.S. PATENT DOCUMENTS

| | | | |
|---|---|---|---|
| 10,712,501 | B2 | 7/2020 | Fattal |
| 10,838,134 | B2 | 11/2020 | Fattal et al. |
| 10,928,677 | B2 | 2/2021 | Aieta et al. |

| | | | | |
|---|---|---|---|---|
| 11,004,407 | B2 | 5/2021 | Fattal et al. | |
| 11,011,121 | B2 | 5/2021 | Fattal et al. | |
| 2007/0040778 | A1 | 2/2007 | Karman et al. | |
| 2009/0033676 | A1* | 2/2009 | Cybart ................. | G09G 3/2003 |
| | | | | 345/589 |
| 2015/0036061 | A1 | 2/2015 | Chen | |
| 2016/0360167 | A1 | 12/2016 | Mitchell et al. | |
| 2017/0178377 | A1* | 6/2017 | Nakano ................. | G06T 11/001 |
| 2018/0190214 | A1* | 7/2018 | Kim ..................... | G09G 3/3413 |
| 2021/0311244 | A1 | 10/2021 | Fattal et al. | |
| 2021/0349331 | A1 | 11/2021 | Joseph et al. | |
| 2022/0279157 | A1* | 9/2022 | Kasahara ............. | H04N 13/351 |
| 2022/0404530 | A1 | 12/2022 | Araya et al. | |

FOREIGN PATENT DOCUMENTS

| | | | |
|---|---|---|---|
| DE | 102021210408 | A1 | 3/2023 |
| EP | B121806 | A1 | 1/2017 |
| WO | 2021085524 | A1 | 5/2021 |
| WO | 2021228331 | A1 | 11/2021 |

* cited by examiner

1

DISPLAY DEVICE, METHOD, COMPUTER PROGRAM CODE, AND APPARATUS FOR PROVIDING A CORRECTION MAP FOR A DISPLAY DEVICE, METHOD AND COMPUTER PROGRAM CODE FOR OPERATING A DISPLAY DEVICE

CROSS REFERENCE TO RELATED APPLICATION

This U.S. patent application claims the benefit of European patent application No. 22194150.3, filed Sep. 6, 2022, which is hereby incorporated by reference.

TECHNICAL FIELD

The present disclosure is related to a display device with a display panel and a decorative element. The disclosure is further directed towards a method, a computer program code, and an apparatus for providing a correction map for such a display device. The disclosure is further related to a method and a computer program code for operating a display device.

BACKGROUND

In the automotive sector, but also in household appliances and other areas of application, such as points-of-sales or advertising panels, there is a trend to keep operating or display functions as hidden as possible when switched off in order to achieve a reduced design with smooth, generous surfaces. Technical elements should only be visible when they are needed. Such concealment techniques are known, for example, as "Shytech" or "Camouflage".

To implement a concealment technology, for example, a display device can be arranged behind a design surface. Transmissive, decorative surfaces suitable for this application can be made in genuine material, e.g. wood, stone, leather, imitation leather, etc., as well as in plastic or glass technology. In this case, the decoration is applied by printing technology to the surface of a cover element or, alternatively, to a surface of a separate foil. The decoration may be applied, for example, as a transmissive print or in the form of a perforated mask.

For example, US 2015/0036061 A1 discloses a display device with a decoration layer, which is at least formed in at least a portion of a view area. When a display module operates to emit light through the decoration layer, the decoration layer appears to be transparent; when the display module does not operate, the decoration layer is irradiated by ambient light to reveal a decorative pattern of the decoration layer.

WO 2021/085524 A1 discloses a display device for mounting onto an object. The display device comprises a display unit that has a display surface and displays video on the display surface, a translucent decorative layer, disposed on the display surface side of the display unit, that provides decoration that harmonizes with the external design of the object, and a translucent one-way mirror layer disposed between the display unit and the decorative layer.

When implementing a concealment technique, the aim is to achieve high-quality resolution of the display through the structure of the decoration. However, in practice, the influence of a variety of parameters leads to impairment of the image quality. These include the use of a surface bezel made of plastic, which supports the decoration and requires a certain mechanical distance from the imaging display surface, the mechanical stability of the cover element, and the mounting process of the display in relation to the cover element.

SUMMARY

It is an object of the present disclosure to provide a solution for improving an image quality of a display device with a display panel and a decorative element.

This object is achieved by a display device, by a method, by a computer program code, which implements such a method, and by an apparatus. The dependent claims include advantageous further developments and improvements of the present principles as described below.

According to a first aspect, a display device comprises a display panel comprising pixels, a cover element, and a decorative element arranged on the cover element, wherein an individual brightness of the pixels of the display panel is adapted to a light transmissivity of the decorative element at the respective pixel positions.

It has been found that the perceived image quality is also affected by the light transmission properties of the decorative element. As the light transmission may not necessarily be uniform over the area of the decorative element, the light transmitted by different pixels of the display panel may suffer different amounts of attenuation. In order to compensate for this spatially varying attenuation, the individual brightness of the pixels is adapted to the light transmissivity of the decorative element at the respective pixel positions. In this way, undesired variations in the brightness of a displayed image are avoided.

In an embodiment, the adaptation of the individual brightness of the pixels is adjusted to a viewer position. In case the decorative element has a certain distance from the pixel plane of the display panel, e.g. due to the thickness of color filters, polarization filters, a bonding layer, etc., it is useful to take a position of a viewer into account. If the viewer looks at the display panel under an angle, parallax effects may occur, i.e., the mapping between the pixels and the decorative element is not identical to the mapping in the case of a perpendicular view. In such a case the adaptation of the individual brightness of the pixels may not be suitable for this viewer and might even lead to a degraded image quality. This issue may be taken into account by adjusting the adaptation of the individual brightness to the specific viewer position. This may be done, for example, based on simple geometric considerations, i.e., by evaluating the light path from a given pixel to the viewer through the decorative element. This approach is particularly suitable if the structuring of the decorative element is coarser than the structuring of the pixels of the display panel. Of course, this issue is less significant the smaller the distance between the pixel plane and the decorative element.

In an embodiment, the adaptation of the individual brightness of the pixels is based on a correction map. Using a correction map constitutes an easy solution for making the necessary information on light transmissivity available. The correction map be stored, for example, in a storage device connected to the display device or otherwise accessible by a controller of the display device. Alternatively, the correction map be used by an image processor when generating images for display by the display device.

In an embodiment, the correction map is derived from a known pattern of the decorative element. If the production process of the display device is sufficiently accurate to realize mounting of the decorative element relative to the display panel with pixel precision, the map may be readily derived from the known distribution of light and dark areas of the decorative element.

In an embodiment, the correction map is obtained in an end-of-line calibration process after production of the display device. During the calibration process the light transmissivity is measured and stored for an individual display device. This solution has the advantage that less accuracy is required in the production process, which reduces production cost.

Accordingly, a method for providing a correction map for a display device according to the disclosure comprises displaying a test image with the display device, determining a light transmissivity of a decorative element of the display device at positions of pixels of a display panel of the display device, and storing the determined light transmissivity or a value derived therefrom in a correction map.

Similarly, a computer program code comprises instructions, which, when executed by at least one processor, cause the at least one processor to perform the following steps for providing a correction map for a display device according to the disclosure, comprising displaying a test image with the display device, determining a light transmissivity of a decorative element of the display device at positions of pixels of a display panel of the display device, and storing the determined light transmissivity or a value derived therefrom in a correction map.

The term computer has to be understood broadly. In particular, it also includes mobile devices, embedded devices, electronic control units and other processor-based data processing devices. The execution of said steps may be performed directly by the processor or may consist in the processor appropriately driving a component intended for the execution of a step, for example a detector.

The computer program code may, for example, be made available for electronic retrieval or stored on a computer-readable storage medium.

Furthermore, an apparatus for providing a correction map for a display device according to the disclosure comprises an image source configured to provide a test image to the display device for display, a processing module configured to determine a light transmissivity of a decorative element of the display device at positions of pixels of a display panel of the display device, and a map generating module configured to store the determined light transmissivity or a value derived therefrom in a correction map.

By displaying one or more test images, e.g. uniform images or images with test patterns, and capturing the light transmitted through the decorative element, it is easily possible to determine the spatial distribution of the light transmissivity of the decorative element. For example, the transmitted light may be captured by a camera or by scanning the area of the decorative element with a photodetector. By comparing the detected brightness for each pixel position with the brightness set in the test images, the light transmissivity can be determined. The determined light transmissivity may then be stored in the correction map. Alternatively, a correction factor or similar measures may be determined from the light transmissivity and stored in the correction map.

In an embodiment, the correction map is updatable during operation of the display device. During operation, properties of the decorative element may change, e.g. due to fading, soiling, or clouding. To compensate for such changes, it is advantageous to perform calibration processes during operation of display device, e.g. at regular intervals or upon a corresponding instruction by a user. For example, in case of a display device in a motor vehicle, a camera mounted in the motor vehicle, e.g. a camera for interior monitoring, may capture images resulting from display of one or more test images. A comparison of these images may then be used for updating the correction map.

In an embodiment, the individual brightness of the pixels is adapted to the light transmissivity of the decorative element individually for different emission wavelengths of the pixels. As the light transmissivity of the decorative element may be wavelength dependent, it useful to take this dependence into account by adapting the brightness individually for the different pixel colors, e.g. Red, Green, and Blue. In this way, color artifacts in the perceived image are avoided.

In an embodiment, the individual brightness of the pixels is adapted by controlling a pixel luminance when addressing the pixels with a drive signal. Correcting the pixel brightness in the control signal may be done in software, i.e., without any modification of the hardware of the display device.

Accordingly, a method for operating a display device comprises retrieving a correction map, and adapting an individual brightness of pixels of a display panel of the display device by controlling a pixel luminance based on the correction map when addressing the pixels with a drive signal.

Similarly, a computer program code comprises instructions, which, when executed by at least one processor, cause the at least one processor to perform the following steps for operating a display device comprising retrieving a correction map, and adapting an individual brightness of pixels of a display panel of the display device by controlling a pixel luminance based on the correction map when addressing the pixels with a drive signal.

The term computer has to be understood broadly. In particular, it also includes embedded devices, electronic control units and other processor-based data processing devices.

The computer program code may, for example, be made available for electronic retrieval or stored on a computer-readable storage medium.

In an embodiment, the display device is a 3D display device. There is a large variety of 3D display technologies available or under development. Generally, they may be differentiated in projector-based and direct view architectures. Main feature of these technologies is the creation of separate views for the left and right eye of one or multiple observers carrying image information with different perspective views, which gives a depth impression to the observer.

Commercial 3D displays typically use auto-stereoscopic concepts with two or multiple views. Examples are liquid crystal displays with a barrier-type shutter, or with a lenticular sheet, or with diffractive lightguide technology.

For all 3D display architectures, the visibility of the image source, such as the display panel, may cause distraction and compromise the quality of the three-dimensional perception of the viewer. In particular, for stereoscopic displays the accommodation-vergence conflict is well known, which can cause nausea feeling because depth information provided by parallax does not match the focus of the eyes on the display surface. In addition, any objects which are reflected by the display or the cover lens will disturb the 3D impression. Not only the image contrast is degraded by such reflections, but also confusing depth information is overlaid on the intended image. By arranging an auto-stereoscopic, multi-view 3D display under a partially transparent decorative surface, the display components are hidden from the users. In addition, unwanted reflections are avoided. In this way, the distraction of the viewer is reduced.

Color and structure of the decorative element may be selected in a way that the displayed information, in particular the 3D impression, is not significantly affected by the surface skin. This means that the material of the decorative element has a minimum scattering for transmitted light. In addition, the transmission properties of the decorative element are designed in a way to hide the display structures, but still provide sufficient transmittance to ensure a bright image which may cope with ambient illumination. In addition, by taking into account the local light transmissivity, a uniform 3D image perception by the observer is ensured.

In an embodiment, the display device further comprises an integrated gesture sensing module. This is particularly advantageous for 3D display devices, as gesture sensing technologies allow supporting user interaction with 3D features in space.

In an embodiment, the display device further comprises an integrated camera. Such a camera allows tracking users through the decorative element. This is particularly useful for adapting 3D image characteristics for certain viewers.

A display device according to the disclosure is used in a motor vehicle, in a household appliance, in a point-of-sales, or in an advertising panel. In particular, the display device may be used to implement a concealment technology. Typical automotive applications include instrument cluster displays, center information displays, or any passenger displays.

BRIEF DESCRIPTION OF THE DRAWINGS

Further features of the present invention will become apparent from the following description and the appended claims in conjunction with the figures.

DETAILED DESCRIPTION

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

Figure 1:
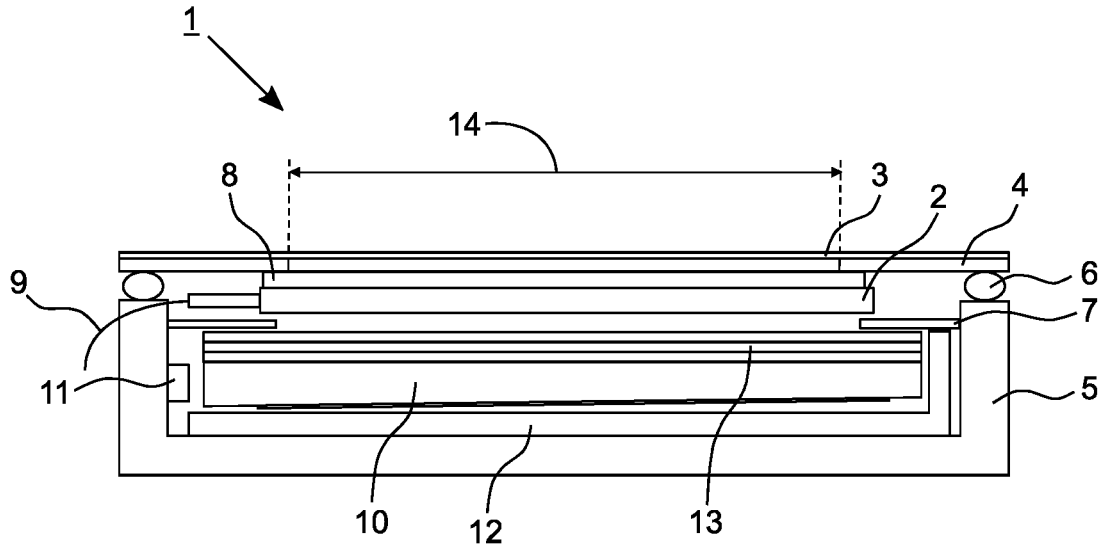
FIG. 1 shows a first embodiment of a display device according to the disclosure.

FIG. 1 shows a first embodiment of a display device 1 according to the disclosure. The display device 1 comprises a display panel 2 with pixels, e.g. a liquid crystal panel, which is arranged in a housing 5 and is connected via a drive line 9 to a drive unit (not shown), which supplies it with power and with image information to be displayed. The housing 5 is sealed by a cover element 4 by fixing elements 6. The display panel 2 is fixed to the cover element 4 by an optical bonding layer 8. A backlight comprising a light guide 10 and one or more light emitting diodes 11 is provided for illuminating the display panel 2. The one or more light emitting diodes 11 are arranged adjacent to the light guide 10 in such way that they emit light towards the light guide 10. The light guide 10 is wedge-shaped in order to avoid light loss when coupling light from the one or more light emitting diodes 11 while keeping the overall design thin. Alternatively, the light guide 10 may be plane-parallel, e.g. if light is coupled in from two or more sides. An optical foil stack 13 is arranged on the light guide 6. The foil stack 13 may comprise a variety of optical foils, such as one or more prism films, a reflective polarizer, a diffuser, etc., depending on the specific requirements. Located below the light guide 10 is a reflector 12, which ensures that the light coupled into the light guide 10 may only leave the light guide 10 towards the display panel 2. A bezel 7 ensures that illumination is limited to the area of the display panel 2. A decorative element 3 is arranged on the cover element 4, which has the appearance of a genuine material, such as wood, stone, leather, imitation leather, etc. The decorative element 3 extends over a visible display area 14 of the display panel 2. As the perceived image quality is affected by the light transmission properties of the decorative element 3, an individual brightness of the pixels of the display panel 2 is adapted to a light transmissivity of the decorative element 3 at the respective pixel positions. In this way, visual artifacts caused by the varying light transmissivity of the decorative element 3 are avoided.

Figure 2:
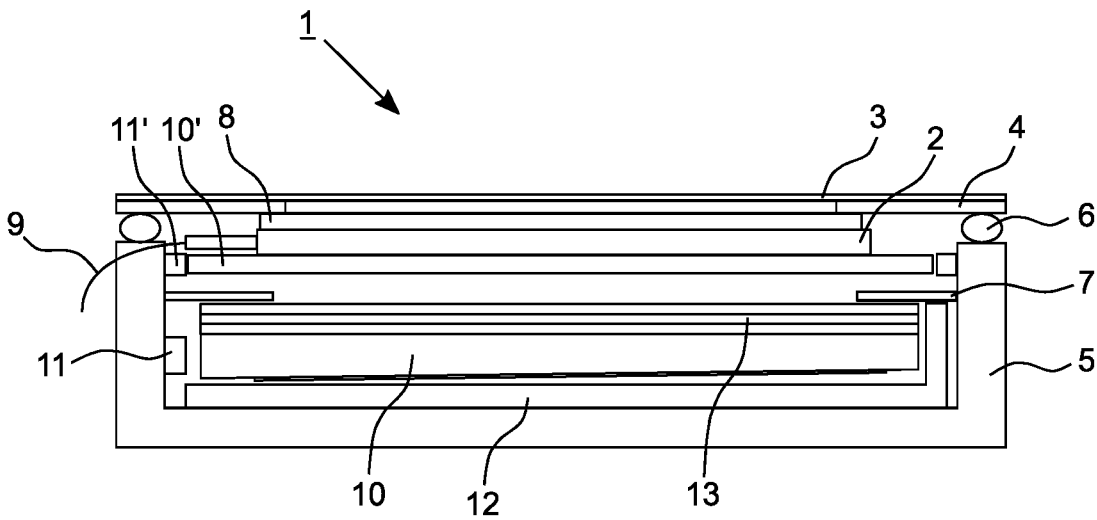
FIG. 2 shows a second embodiment of a display device according to the disclosure.

FIG. 2 shows a second embodiment of a display device 1 according to the disclosure. In this example, the display device 1 is a 3D display device using a diffractive backlight. The display device 1 is largely identical to the display device 1 of FIG. 1. However, the display device 1 comprises a further light guide 10' located below the display panel 2, into which light of one or more further light emitting diodes 11' is coupled.

Figure 3:
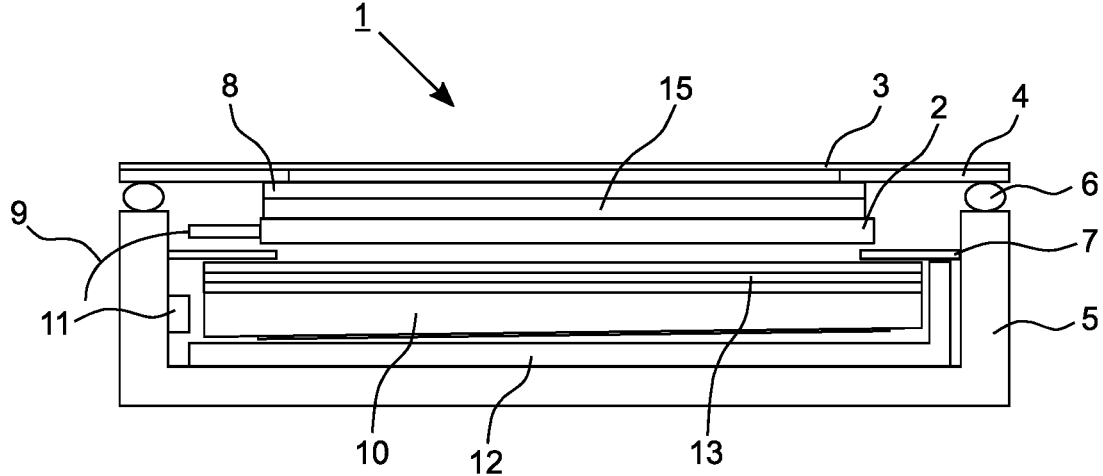
FIG. 3 shows a third embodiment of a display device according to the disclosure.

FIG. 3 shows a third embodiment of a display device 1 according to the disclosure. In this example, the display device 1 is a 3D display device using a lenticular sheet 15. The display device 1 is largely identical to the display device 1 of FIG. 2. However, instead of a further light guide below the display panel 2, a lenticular sheet 15 is arranged above the display panel 2.

Figure 4:
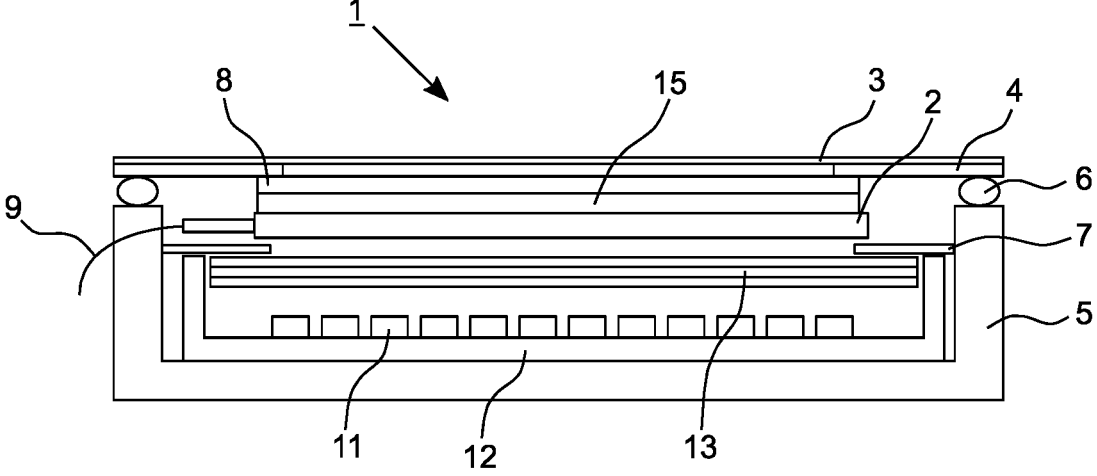
FIG. 4 shows a fourth embodiment of a display device according to the disclosure.

FIG. 4 shows a fourth embodiment of a display device 1 according to the disclosure. Again, the display device 1 is a 3D display device using a lenticular sheet 15. The display device 1 is largely identical to the display device 1 of FIG. 3. However, in this case a matrix backlight comprising a plurality of light emitting diodes 11 is used for illuminating the display panel 2.

Figure 5:
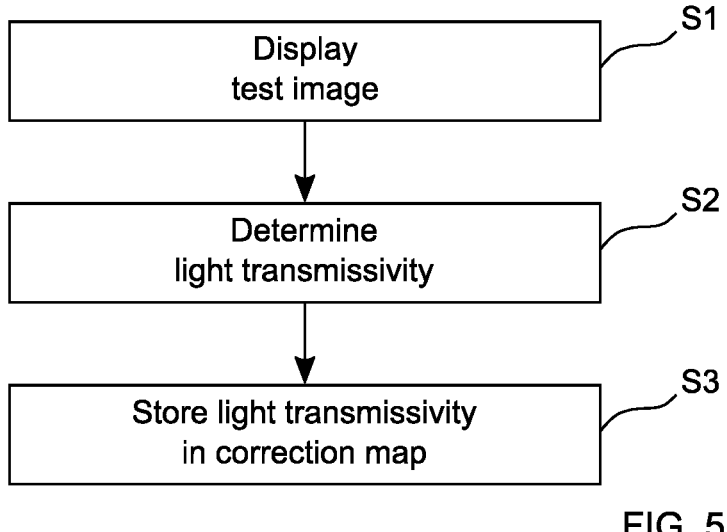
FIG. 5 schematically illustrates a method for providing a correction map for a display device.

FIG. 5 schematically illustrates a method for providing a correction map for a display device. In a first step, one or more test images are displayed S1 by the display device. A light transmissivity of a decorative element of the display device is then determined S2 at positions of pixels of a display panel of the display device. To this end, the light transmitted through the decorative element may be captured by a camera or by scanning the area of the decorative element with a photodetector. By comparing the detected brightness for each pixel position with the brightness set in the test images, the light transmissivity may be determined. The determined light transmissivity or a value derived therefrom is then stored S3 in a correction map. The method of FIG. 5 may be performed in an end-of-line calibration process after production of the display device or in a calibration process during operation of the display device. If the display panel and the decorative element may be aligned so precisely against each other that exactly the same transmission matrix results for each device, and if the emission and transmission are the same in each case, then the correction map can be determined once during development, i.e., the subsequent calibration process can be omitted.

Figure 6:
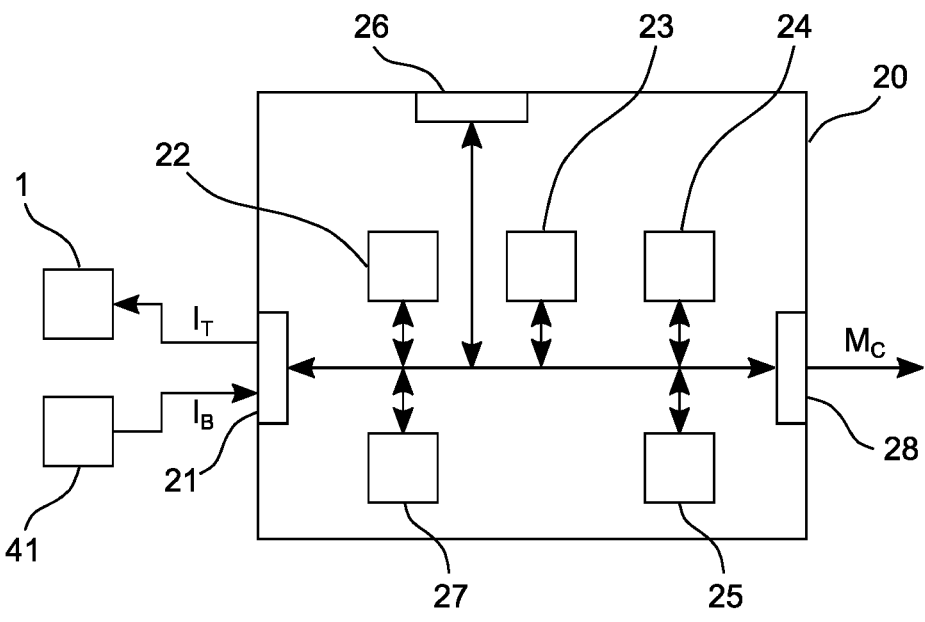
FIG. 6 schematically illustrates a first embodiment of an apparatus for providing a correction map for a display device.

FIG. 6 schematically illustrates a first embodiment of an apparatus 20 for providing a correction map for a display device 1. The apparatus 20 has an interface 21, via which an image source 22 provides one or more test images IT to the display device 1 for display. A processing module 23 is configured to determine a light transmissivity of a decorative element of the display device 1 at positions of pixels of a display panel of the display device. To this end, the processing module 23 may receive, via the interface 21, information IB about the brightness of light transmitted through the decorative element, which may be captured by a camera 41 or by scanning the area of the decorative element with a photodetector. By comparing the detected brightness for each pixel position with the brightness set in the test images IT, the processing module 23 is able to determine the light transmissivity. A map generating module 24 is configured to store the determined light transmissivity or a value derived therefrom in a correction map Mc. The correction map Mc may then be provided to a further processing stage via an output 28. The output 28 may be combined with the interface 21 into a single interface. A local storage unit 27 is provided for storing data during processing.

The image source 22, the processing module 23, and the map generating module 24 may be controlled by a control module 25. A user interface 26 may be provided for enabling a user to modify settings of the image source 22, the processing module 23, the map generating module 24, or the control module 25. The various components of the apparatus 20 may be embodied as dedicated hardware units. Of course, they may likewise be fully or partially combined into a single unit or implemented as software running on a processor, e.g., a CPU or a GPU.

Figure 7:
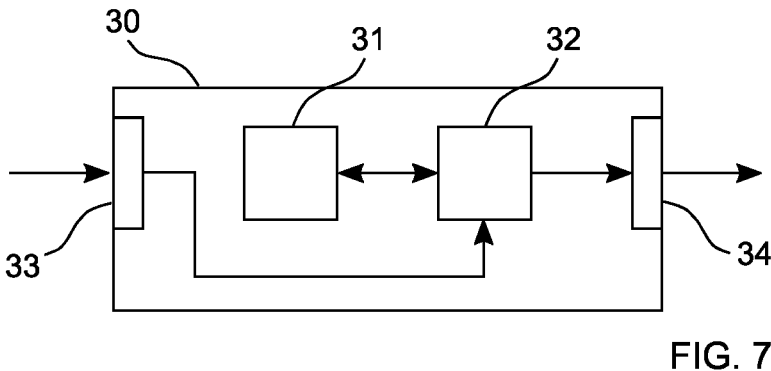
FIG. 7 schematically illustrates a second embodiment of an apparatus for providing a correction map for a display device.

A block diagram of a second embodiment of an apparatus 30 for providing a correction map for a display device is illustrated in FIG. 7. The apparatus 30 comprises a processing device 32 and a memory device 31. For example, the apparatus 30 may be a computer, an electronic control unit or an embedded system. The memory device 31 has stored instructions that, when executed by the processing device 32, cause the apparatus 30 to perform steps according to one of the described methods. The instructions stored in the memory device 31 thus tangibly embody a program of instructions executable by the processing device 32 to perform program steps as described herein according to the present principles. The apparatus 30 has an input 33 for receiving data. Data generated by the processing device 32 are made available via an output 34. In addition, such data may be stored in the memory device 31. The input 33 and the output 34 may be combined into a single bidirectional interface.

The processing device 32 as used herein may include one or more processing units, such as microprocessors, digital signal processors, or a combination thereof.

The local storage unit 27 and the memory device 31 may include volatile and/or non-volatile memory regions and storage devices such as hard disk drives, optical drives, and/or solid-state memories.

Figure 8:
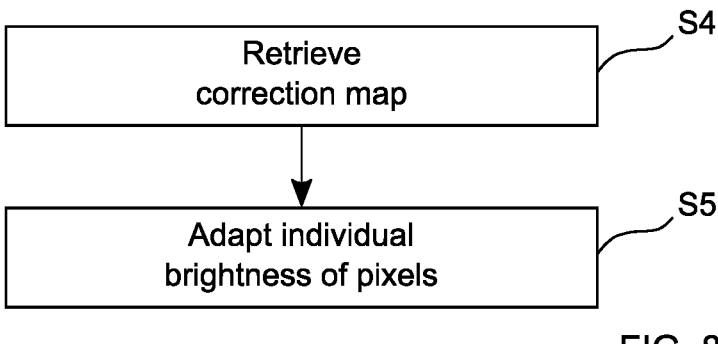
FIG. 8 schematically illustrates a method for operating a display device.

FIG. 8 schematically illustrates a method for operating a display device. In a first step, a correction map is retrieved S4. Then an individual brightness of pixels of a display panel of the display device is adapted S5. To this end, a pixel luminance is controlled based on the correction map when addressing the pixels with a drive signal.

Figure 9:
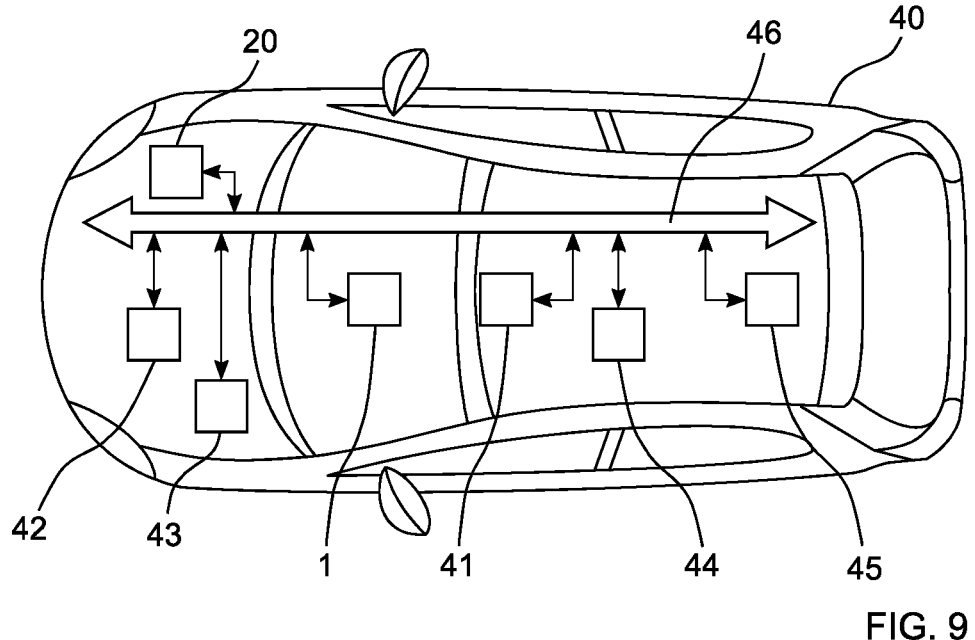
FIG. 9 schematically illustrates a motor vehicle in which a solution according to the invention is implemented.

FIG. 9 schematically shows a motor vehicle 40, in which a solution in accordance with the invention is implemented. In this example, the motor vehicle 40 is a car. The car has a camera 41 for monitoring a vehicle cabin and a number of other environment sensors 42, such as ultrasonic sensors, laser scanners, lidar sensors, or radar sensors. The data provided by the camera 41 or the other environment sensors 42 may be used by a driver assistance system 43 as a basis for performing autonomous driving functions or driver assistance functions. The camera 41 may further be used by an apparatus 20 according to the disclosure for providing a correction map for a display device 1 of the motor vehicle 40. To this end, the camera 41 may capture one or more test images displayed by the display device 1. A data transmission unit 44 allows a connection to a remote backend or to other motor vehicles. A memory 45 is available for storing data. The data exchange between the different components of the motor vehicle 40 takes place via a network 46. A correction map may be stored in the memory 45 or a memory of the display device 1. The correction map may be used for adapting an individual brightness of pixels of a display panel of the display device 1 to a pattern of a decorative element of the display device 1.

The invention claimed is:

1. A display device, comprising:
a display panel comprising pixels;
a cover element; and
a decorative element arranged on the cover element, wherein an individual brightness of the pixels of the display panel is adapted to a light transmissivity of the decorative element at the respective pixel positions, based on a correction map which comprises a determined light transmissivity of the decorative element at positions of the pixels, or a value derived therefrom.

2. The display device according to claim 1, wherein the adaptation of the individual brightness of the pixels is adjusted to a viewer position.

3. The display device according to claim 1, wherein the correction map is derived from a known pattern of the decorative element.

4. The display device according to claim 1, wherein the correction map is obtained in an end-of-line calibration process after production of the display device.

5. The display device according to claim 1, wherein the correction map is updatable during operation of the display device.

6. The display device according to claim 1, wherein the individual brightness of the pixels is adapted to the light transmissivity of the decorative element individually for different emission wavelengths of the pixels.

7. The display device according to claim 1, wherein the individual brightness of the pixels is adapted by controlling a pixel luminance when addressing the pixels with a drive signal.

8. The display device according to claim 1, wherein the display device is a 3D display device.

9. The display device according to claim 1, further comprising an integrated gesture sensing module or an integrated camera.

10. A method for providing a correction map for a display device, comprising:

displaying a test image with the display device;

determining a light transmissivity of a decorative element of the display device at positions of pixels of a display panel of the display device;

storing the determined light transmissivity or a value derived therefrom in the correction map, and adapting an individual brightness of the pixels on the correction map.

11. The method according to claim 10, wherein the method is performed in an end-of-line calibration process after production of the display device or in a calibration process during operation of the display device.

12. A method for operating a display device, comprising:

displaying a test image with the display device;

determining a light transmissivity of a decorative element of the display at positions of pixels of a display panel of the display device retrieving a correction map; and adapting an individual brightness of pixels of a display panel of the display device by controlling a pixel luminance based on the correction map when addressing the pixels with a drive signal.

13. A computer program code comprising instructions stored on a nontransient computer readable medium, which, when executed by at least one processor, cause the at least one processor to perform a method for operating a display device, comprising:

displaying a test image with the display device;

determining a light transmissivity of a decorative element of the display device at positions of pixels of a display panel of the display device; and storing the determined light transmissivity or a value derived therefrom in the correction map;

retrieving a correction map; and adapting an individual brightness of pixels of a display panel of the display device by controlling a pixel luminance based on the correction map.

* * * * *